Sept. 30, 1941.  W. H. BECKMANN  2,257,669
ARTIFICIAL TOOTH AND HOLDER THEREFOR
Filed Jan. 30, 1939
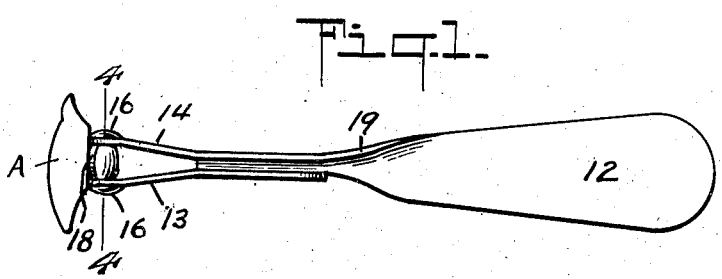
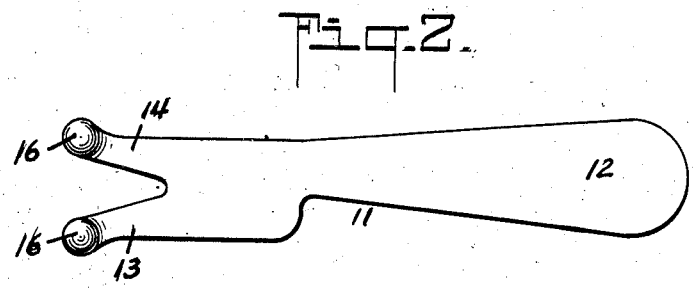
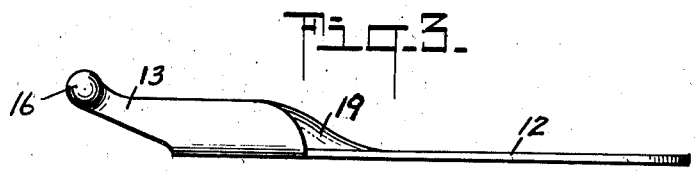
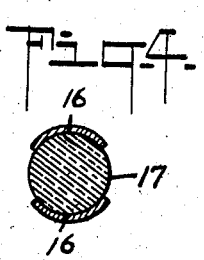
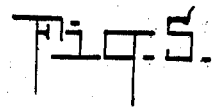
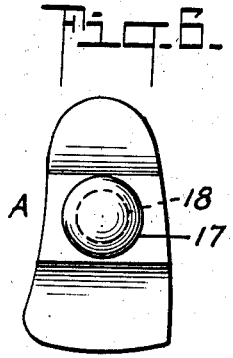
INVENTOR
WILLIAM H. BECKMANN,
BY
ATTORNEY Patented Sept. 30, 1941

2,257,669

UNITED STATES PATENT OFFICE 2,257,669

ARTIFICIAL TOOTH AND HOLDER THEREFOR

William H. Beckmann, Glen Rock, Pa., assignor to The Dentists' Supply Company of New York, New York, N. Y., a corporation of New York Application January 30, 1939, Serial No. 253,468

1 Claim. (Cl. 128—68)

This invention relates to an artificial tooth and a holder therefor, and has special reference to a tooth holder which will permit substantially universal movement of the tooth therein.

The object of the invention is to provide an artificial tooth and a holder therefor which will permit the tooth to be turned to various angles and positions whereby it can be held against the patient's natural teeth or artificial teeth for the purpose of matching same with respect to color, translucency, etc.

A further object of the invention is to provide an artificial tooth holder to which the tooth can be connected without the use of rivets or the like.

Another object of the invention is to provide an artificial tooth holder from which the tooth may be removed, and another tooth secured therein when the styles, hues, etc. are changed.

Still another object of the invention is to provide an artificial tooth holder which can be made from a single piece of metal stamped and shaped to form.

According to the invention, the artificial tooth holder comprises a handle, a pair of fingers having concaved depressions in the end thereof, said fingers being positioned so that the depressions are opposed to one another to form a ball socket for yieldably holding therebetween a rounded protuberance on the back of an artificial tooth. The holder may be made by stamping and shaping a single piece of metal to form.

The process of manufacture is to provide a blank having a handle at one end and forked fingers having concaved depressions at the other end, then bending the fingers into lateral alignment so that the depressions are opposed, and between which the protuberance of an artificial tooth may be yieldably held.

The drawing illustrates an embodiment of the invention, and the views therein are as follows:

Figure 1 is a top plan view of the holder showing an artificial tooth held thereby, Figure 2 is a plan view of the blank for making the holder, Figure 3 is a side elevation of the holder after being bent to form, Figure 4 is a vertical sectional view on the line 4—4 of Figure 1, Figure 5 is a side elevation of an artificial tooth having a protuberance with a rounded head for being retained in the opposed concaved depressions on the fingers of the holder, and Figure 6 is a rear view of the tooth of Figure 5.

As illustrated in the drawing and particularly in Figure 2, the holder is made from a blank 11 which may be of spring metal, such for instance as stainless steel. The blank is provided at one end with a handle portion 12, and with forked fingers 13 and 14. These fingers are provided at the extremities thereof with concaved depressions 16. The blank 11 of Figure 2 is bent so as to bring the fingers 13 and 14 into lateral alignment, and at substantially right angles to the handle 12. When the holder is bent in this manner, the concaved depressions 16 will be opposed as shown in Figure 4, so as to form a substantial ball socket into which the rounded head 17 of the protuberance 18 on the artificial tooth "A" fits, and which will be thereby yieldably held so as to permit the tooth to be turned into substantially any angle or position desired.

The holder may, of course, be made from a base material nickel plated, or, in fact, from any material which has a modulus sufficiently high to permit the fingers 13 and 14 to retain the positions into which they are bent, even though they may be spread numerous times for the purpose of securing and removing an artificial tooth therefrom. The blank is so formed that the twisted portion 19 serves as a strengthening rib between the handle 12 and fingers 13.

Of course, the artificial tooth holder and the tooth for support thereby shown and described herein may be modified in various ways without departing from the invention herein set forth and hereafter claimed.

The invention is hereby claimed as follows:

A shade guide holder consisting of a unitary elongate piece of sheet metal shaped to provide a substantially flat handle portion, and a tooth-holding portion, the tooth-holding portion comprising a pair of spaced gripping elements between which the protuberance of a tooth may be introduced, said gripping elements being at the extremities of a pair of fingers integral with the handle portion, the material intermediate one, at least, of said gripping elements and the handle portion being twisted through substantially 90°, the fingers being resilient and having opposed aligned depressions to receive a protuberance of an artificial tooth, and the depressed portions of said fingers being spaced from the plane of the handle portion.

WILLIAM H. BECKMANN.